March 6, 1962
M. SEYMOUR
3,023,430
FOAMED CUSHIONING MATERIAL FOR CONTOURED
CHAIRS AND METHOD OF MAKING SAME
Filed March 3, 1958
2 Sheets-Sheet 1
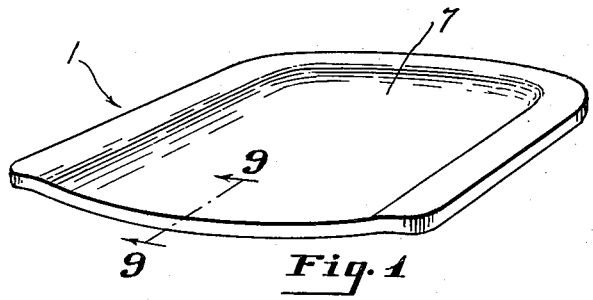
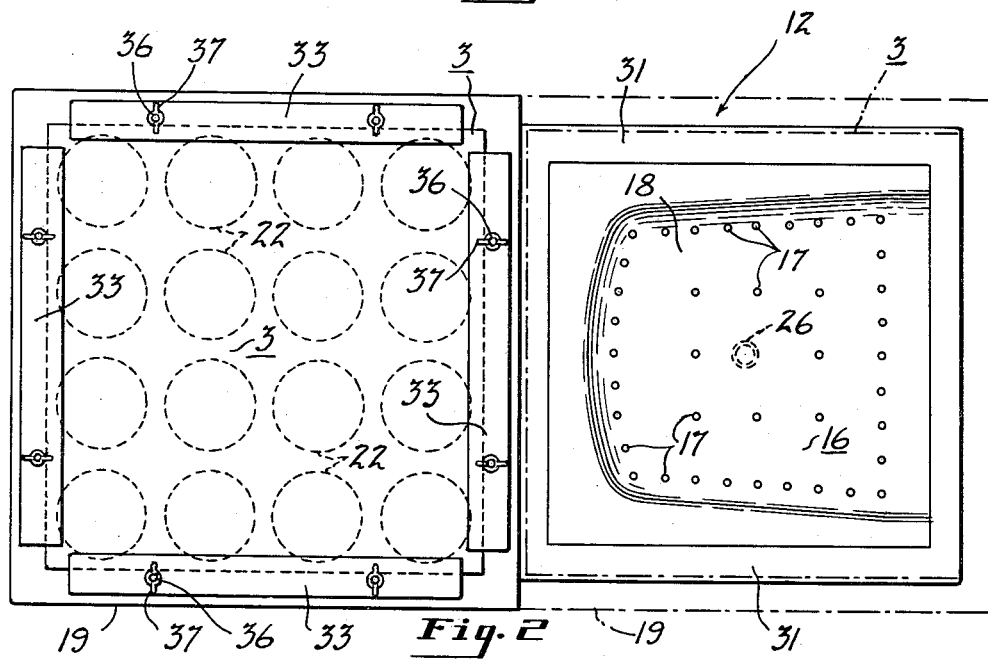
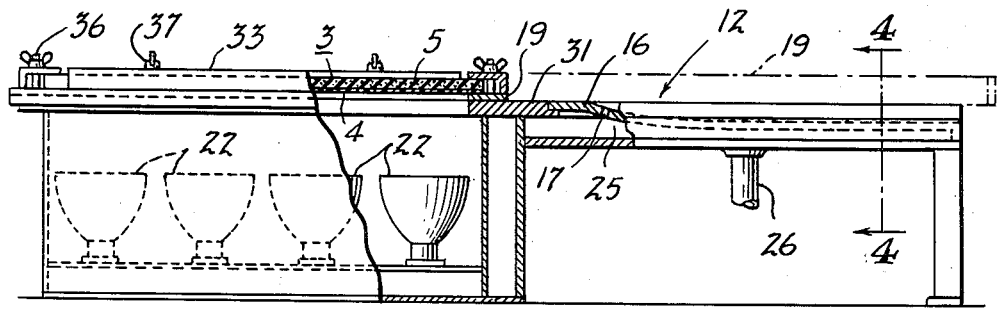
INVENTOR
Malcolm Seymour
BY McCoy, Greene + Legrotenhuis
ATTORNEYS March 6, 1962

M. SEYMOUR 3,023,430

FOAMED CUSHIONING MATERIAL FOR CONTOURED
CHAIRS AND METHOD OF MAKING SAME

Filed March 3, 1958

INVENTOR
Malcolm Seymour
BY
McCoy, Greene + Le Grotenhuis
ATTORNEYS

United States Patent Office 3,023,430
Patented Mar. 6, 1962

3,023,430
FOAMED CUSHIONING MATERIAL FOR CONTOURED CHAIRS AND METHOD OF MAKING SAME
Malcolm Seymour, North Andover, Mass., assignor to The General Tire & Rubber Company, Akron, Ohio, a corporation of Ohio
Filed Mar. 3, 1958, Ser. No. 718,587
3 Claims. (Cl. 5—345)

This invention relates to cushioning material which is suitable for fastening over curved and contoured surfaces of glass fiber reinforced polyester chairs and the like.

Contoured chairs and other articles made of fiber glass-polyester resin compositions and the like have wide commercial possibilities, being lightweight, and yet possess great strength. Such base materials also have excellent chemical and moisture resistance, scratch resistance and impact resistance and can be readily produced with complex surface contours and designs. However, a serious drawback to their use in the fact that flexible resilient cushioning materials such as polyvinylchloride and polyurethane foams, which are generally produced in the form of slabs, cannot be easily fastened satisfactorily to the concavely curved surfaces of the contoured chair.

It is an object of the present invention to provide a flexible foamed plastic cushioning material which is adapted to follow curved surfaces of complexly designed furniture, and a method of making the same.

It is an object to provide a laminated cushioning material of a flexible plastic foam which can be quickly and economically vacuum formed to a shape which closely follows the contour of highly curved surfaces such as those found in glass-fiber reinforced polyester composition chairs, molded plywood chairs, and the like.

It is an object to provide a method of making a flexible resilient cushioning material which can be economically shaped by vacuum forming to closely follow and overlay curved surfaces of articles such as polyester resin-glass fiber composition furniture and the like.

These and other objects will become apparent to those skilled in the art from the following description, the appended claims and the drawings in which:

FIGURE 1 is a perspective view of a contoured chair seat covered with a cushioning material in accordance with the present invention;

FIGURE 2 is a plan view of a vacuum forming apparatus;

FIGURE 3 is an elevational view of the vacuum forming apparatus of FIG. 2 with parts broken away and shown in section;

Figure 9:
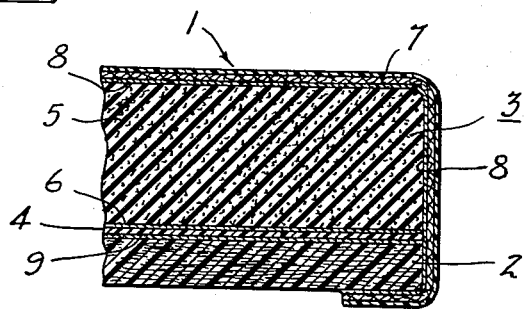
FIGURE 9 is a fragmentary sectional view taken along the lines 9—9 indicated in FIG. 1.

Referring to the drawings, FIG. 1 shows a contoured chair seat 1. The chair seat comprises, as best seen in FIGS. 5, 6, 7 and 8, a base 2 of a glass-fiber-reinforced polyester resin composition and a laminated cushion 3 therefor which in turn comprises a relatively thin layer 4 of a rigid thermoplastic composition such as unplasticized polyvinylchloride, polystyrene etc., adjacent the base layer 2 and a relatively thick layer 5 of a flexible resilient suitable foamed material preferably polybutane bonded to the thin layer 4 by means of a relatively thin adhesive layer 6. In accordance with the present invention an excellent flexible cushioning material such as the foamed layer 5 can be fastened, bonded to, or otherwise used next to a surface of a highly curved base material without wrinkling or bunching. If desired, the foamed layer 5 can be covered with an outer covering layer 7 of a suitable upholstery material such as a flexible fabric-backed plasticized polyvinylchloride sheeting. The polyvinylchloride sheeting may be fastened to the cushion and base by any suitable means such as by an adhesive layer 8, best shown in FIG. 9. Also as seen in FIG. 9, the cushioning foam is perfectly fitted to the base 2 by an adhesive layer 9 which bonds the thin rigid thermoplastic layer 4 of the laminated cushion 3 to the base 2.

I have found that the formation of the cushion 3 from convenient flat thermoplastic sheets and flat slabs of foamed material is an important element in my process. The foam layer 5 is shaped and held in place by the rigid thermoplastic layer 4 to eliminate unsightly wrinkles in the foam rubber and subsequent poor durability.

Figure 4:
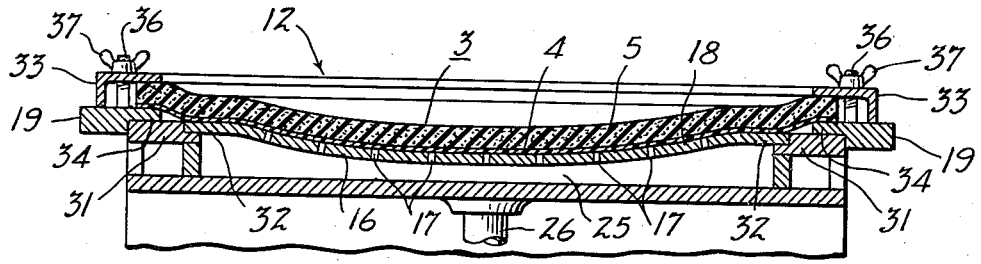
FIGURE 4 is a fragmentary sectional view taken along the lines 4—4 indicated in FIG. 3 with the apparatus in forming position.
Figure 5:
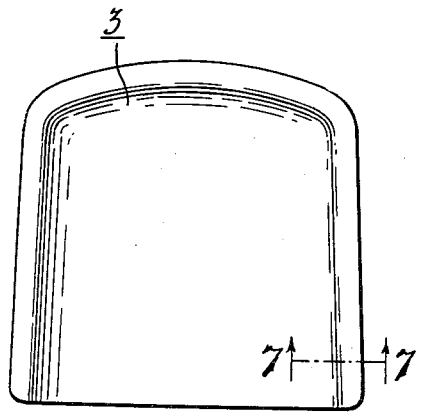
FIGURE 5 is a plan view of a cushioning material made in accordance with the present invention.
Figure 6:
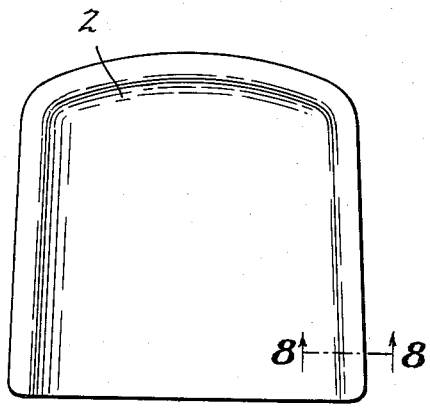
FIGURE 6 is a plan view of a contoured seat base made of a suitable fiber reinforced plastic material.
Figure 7:
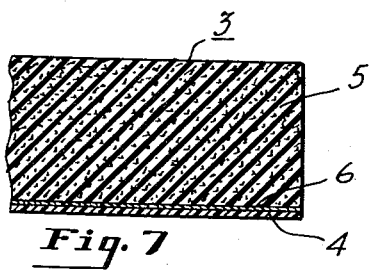
FIGURE 7 is a fragmentary sectional view taken along the lines indicated at 7—7 in FIG. 5.
Figure 8:
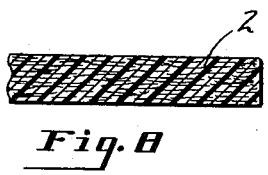
FIGURE 8 is a fragmentary sectional view taken along the lines indicated at 8—8 in FIG. 6.

The shaping of the cushion 3 is accomplished in a vacuum forming apparatus 12 as best seen in FIGS. 2, 3 and 4. The vacuum forming apparatus comprises a perforated molding plate 16 with a plurality of small openings 17 and a molding surface 18. In addition, the apparatus has a movable frame 19 which carries the cushion 3 from a first position outside the molding plate 16 where the thermoplastic layer 4 may be heated by banks of infrared lamps 22 to a second position directly over molding plate 16 as illustrated by dot-dash lines in FIG. 3.

The vacuum forming apparatus also comprises a hollow container 25 in which a vacuum is produced by evacuating air therefrom through a vacuum conduit 26 by suitable vacuum pumping means (not shown).

The thermoplastic layer 4 of the laminated cushion 3 is formed to the contour of the molding surface 16 by the force created by atmospheric pressure outside the hollow container 25 and reduced pressure inside the container when the heated thermoplastic sheet 4 and unheated attached foam layer 5 is slid into position over the mold. The movement of the thermoplastic layer 4 is terminated by its conformation to the shape of the molding surface 16. Upon cooling, the thermoplastic layer 4 becomes rigid and is shaped according to the outline of molding surface 18.

To continue the description of the vacuum forming process and apparatus, the cushion 3 may be moved to and away from a molding plate 16 by a cushion carrying frame 19 which slides and rides on flat frame support 31 which holds and supports marginal edges 32 of molding plate 16. The slidable frame 19 and fixed mold plate frame 31 have generally rectangular outlines with the frame 19 being slightly larger. When frame 19 is positioned over support 31 a leak proof seal is provided by the contact of a flange 34, the frame 19 and mold plate 31. The flange 34, which runs continuously along the inner perimeter of frame 19, rests on the outer marginal upper surface and edge of support 31 to provide a good seal during the application of vacuum.

To begin a vacuum forming cycle, the edges of the cushion 3 are clamped to the slidable frame 19 by means of angles 33 of L-shaped cross section using bolts 36 and wing nuts 37. To finish the forming cycle, the cushion 3 can be released easily from the frame 19 by removing the bolts 36.

The cushion 3 is cooled and is then ready for use with the base 2. The cushion 3 is preferably covered with a layer 7 of upholstery material which can be adhered to the base 2 by use of adhesive, staples, fabric thread ties or can even be placed on the polyester base loosely particularly if the base 2 is a chair seat with the usual concave central portion.

The foam layer 5, which is preferably a cellular polyvinyl chloride or flexible polyether urethane or polyester urethane, is attached and adhered to the thin thermoplastic sheet 4 before the forming process so that it is formed into a contoured shape along with the thermoplastic sheet. Generally the foamed layer, itself, after the shaping operation, is concave in form as best noted in FIG. 4. As previously described, the foam layer is prevented from returning to its original flat form by its bond with the rigid thermoplastic layer. The foam layer is preferably not heated when the thermoplastic sheet is heat softened particularly when the foamed material is polyvinyl chloride since it usually cannot be heat set in any position without destroying its structure.

The foam material may as above indicated be a plasticized polyvinyl chloride foam. A foam of a copolymer of vinyl chloride wtih vinyl acetate or vinylidene chloride or any other resilient cellular load-supporting foamed materials readily obtainable in flat slab form may be used as the cushioning layer such as latex sponge rubber or a cellular polyurethane elastomer formed from the reaction of a hydroxyl-terminated polyol such as a polyalkylene ether glycol or a polyester having a molecular weight of at least 500 and a polyisocyanate having 2 to 3 functional isocyanate groups.

The thin thermoplastic sheet material used in the present invention is preferably a rigid impact resistant heterogeneous mixture of a styrene-acrylonitrile copolymer resin and a butadiene-acrylonitrile copolymer rubber although other rigid vacuum formable thermoplastic materials can be used such as a mixture of polyvinyl chloride resin, styrene-acrylonitrile resin and a rubbery copolymer of butadiene with acrylonitrile or methylisopropenylketone. These materials are characterized by softening at sufficiently elevated temperatures such as 100° C. and hardening to a rigid glass-like solid at room temperature.

The upholstery material of layer 7 can be a plastic backed sheeting. The plastic of the top layer is preferably a polyvinyl base composition which is plasticized to a flexible state. The top layer may be easily colored by suitable oxides or pigments so as to match or harmonize with the color of other furniture. Other features of a top layer of a polyvinyl halide compound are that it may be provided with ribs or designs and it may be cleaned very easily.

The base layer 2 is preferably a polyester resin composition strengthened and reinforced with glass fibers.

The preferred polyester resins are adapted to molding at low pressures which are generally about 20 to 60 pounds per square inch, and at low temperatures which are generally about 180 to 280° F. and preferably 200 to 260° F. The molding temperature should for best results be above the softening point of the thermoplastic layer. The polyesters suitable in the present invention are unsaturated and cure by means of the double bond and do not cure by condensation and the accompanying liberation of water as do phenolic resins. As a consequence, the polyester resins do not require high pressure in the molding and laminating operations as do the phenolic resins, which is a definite advantage in many applications.

Suitable unsaturated polyesters may be formed by reacting a glycol or bifunctional polyol of the general formula HO—(RO)$_n$—H, in which $n$ is an integer of 1 to 50 and R is a hydrocarbon and preferably a divalent alkylene group such as ethylene, propylene and butylene with an unsaturated polycarboxylic acid such as maleic and fumaric acid or mixture of such unsaturated acid with saturated dicarboxylic acid as is well known in the art. The unsaturated polyester also may be formed by reacting a dicarboxylic acid such as terephthalic and isophthalic acids having no aliphatic unsaturation with an unsaturated alcohol such as alkyl alcohol.

As is well known in the art, unsaturated polyesters are formed by reacting polyglycols with the polycarboxylic acids with loss of water until the desired viscosity is obtained. The polyesters thus formed are usually mixed with polymerizable olefinic compounds such as styrene, methyl methacrylate, dialkyl phthalate, etc. and the mixture cured in contact with reinforcing glass fibers, etc. by catalysts such as a free radical producing catalyst of which benzoyl peroxide, dicumyl peroxide, and cumine hydroperoxide are examples. The weight of the reinforced glass fibers is usually about 20 to 70% by weight of the total layer and the fiber distribution in the layer preferably is as uniform as possible to eliminate a bumpy surface.

In place of fiber glass mats, felted and interwoven materials which are characterized by random arrangements of various fibers may be used. Suitable fibers are cotton, rayon and other synthetic fibers. However, the substitution of such fibers for glass fibers greatly decreases the strength and resistance of the article to water and weather.

When a polyvinyl chloride foamed slab is used with thin rigid sheet of a mixture of a styrene-acrylonitrile resin and a butadiene acrylonitrile rubber to form a cushion, a phenolic resin-acrylonitrile rubber adhesive such as C-9 III sold by Pierce and Stevens is preferably used to bond the sheets together. A polyisobutylene rubber-polyoctyl acrylate adhesive in the form of a 10% by weight solution of a mixture of about equal parts of rubbery isobutylene polymer and polyoctyl acrylate in a mixture of about equal parts of methyl ethyl ketone and toluene may be used to bond the thermoplastic layer 4 to the foamed material 5 and is particularly effective when the layer 4 is a rigid vacuum formable polyvinyl chloride composition and the foamed layer 5 is a cellular polyurethane elastomer such as one formed from a polyalkylene ether glycol including poly(ethylene-propylene) ether glycol and a diisocyanate including a mixture of 2,4- and 2,6-tolylene diisocyanates.

Epoxy type resin cements can be used in which the resinous material comprises about 15 to 50 percent by weight of a condensation product of an aliphatic organic compound having an ethylene group on at least one of its chain ends such as 1-chloro-2,3-epoxypropane with a di- or tri-hydroxy organic compound such as bisphenol A (2,2-p-hydroxy phenyl propane), bisphenol B, glycerol or ethylene glycol. The resins of the adhesive layer 6 should be compatible with the thin layers of rigid polyvinyl chloride or rigid styrene resin-acrylonitrile resin mixture since the main problem for good adhesion apparently is getting a suitable material to bond the thin thermoplastic layer.

The invention is further illustrated with the following example:

*Example*

A 1/16 inch thick sheet of a rigid heterogeneous mixture of a styrene-acrylonitrile resin and a butadiene-acrylonitrile rubber was brush-coated with an adhesive comprising a phenolic resin and a butadiene-acrylonitrile rubber. The adhesive coating on the rigid sheet was air dried for 15 minutes and then the sheet placed on a 3/4 inch thick polyvinyl chloride foam having a density of 5½ pounds/ft.$^3$ to form a cushion. The two-layer cushion was then prepared for a vacuum forming operation by securing it in a frame of molding apparatus similar to that shown in the drawings. The thermoplastic sheet was heated to a heat softened state and then moved over a molding plate. A vacuum was applied to the thermoplastic sheet which pulled it, and the vinyl foam layer, into the desired shape, following the contour of the molding plate. The thermoplastic sheet was cooled by a stream of compressed air and the laminated cushion removed from the mold. The laminated cushioning structure was placed in a chair seat base of a glass fiber reinforced polyester material with the rigid thermoplastic layer next to the polyester base and adhered thereto with a natural rubber base cement. An excellent cushion was thus provided for a contoured chair seat.

Also in accordance with the present invention, I have found that it is possible to prepare a cushion by placing the laminate of thin thermoplastic sheet and thick foamed sheet in the vacuum forming apparatus so that the foamed layer is between the thermoplastic layer and the molding plate. In this manner the thermoplastic layer serves to form the foamed layer and at the same time rigidly holds the foamed material in the desired shape. Satisfactory cushions have been prepared for furniture pieces in this manner provided the base surface is not too curved or irregular since the rigid thermoplastic layer cannot be formed as accurately when in this position as when it is next to the molding plate.

It is also possible in accordance with the present invention to use a perforated chair seat base 2 and further, that the convex side of base 2 be used as the molding surface to form the cushion 3. Thus thermoplastic layer 4 would be pulled down into the desired shape by the application of vacuum utilizing slits or perforations in the polyester-fiber base itself.

It is to be understood that various modifications of embodiments of the invention shown herein may be resorted to without departing from the spirit of the invention.

What I claim is:

1. In an article such as a chair and the like, a base of a polyester-glass fiber composition having a contoured form with curved surface portions, a relatively thin layer of a rigid thermoplastic composition adjacent one of the surfaces of the base and shaped so as to conform with the adjacent surface of the base, a relatively thick layer of a flexible resilient foamed material adhered to said thermoplastic layer by a layer of an adhesive composition, said layer of foamed material having a substantially homogeneous cell structure throughout its length and width and being shaped so as to follow the contour of the thermoplastic layer surfaces which in turn follow the contour of the surface of the base adjacent the thermoplastic layer.

2. In an article for a chair and the like in which a base of a fiber-reinforced polyester composition is used as the frame work and supporting material for the article, a relatively thin inner layer of a rigid thermoplastic composition adjacent the base and so adapted and shaped as to follow the contour of one of the surfaces of the base, and a relatively thick outer layer of a cellular elastic material bonded to said inner layer at the side opposite the base by an adhesive composition, the outer layer also being adapted and shaped so as to follow the contour of the said surface of the base and the contour of the surface of the inner layer adjacent the outer layer, said outer layer having a generally uniform thickness and a generally homogeneous cell structure throughout its length and width.

3. A method of forming a cushion for a contoured furniture piece from a relatively thick flat slab of resilient foamed material and a relatively thin flat sheet of a rigid thermoplastic material comprising the steps of adhering the foamed material to the thermoplastic material, heating the side of the thermoplastic layer opposite to that adhered to the foamed layer to a heat-softened state, holding the thermoplastic layer with the foamed material adhered thereto in contact with a curved molding surface by air pressure, said curved molding surface having substantially the same contour as the surface of the furniture piece, and cooling the thermoplastic layer to a rigid state while it is held in contact with said curved molding surface by said air pressure and while the outer surface of said foamed material is exposed, whereby a contoured cushion is formed with an outer layer of foamed material having a substantially homogeneous cell structure throughout its length and width.

References Cited in the file of this patent

UNITED STATES PATENTS

| | | |
|---|---|---|
| 1,878,086 | Woodall et al. | Sept. 20, 1932 |
| 2,149,507 | Camfield | Mar. 7, 1939 |
| 2,539,058 | Burns | Jan. 23, 1951 |
| 2,571,209 | Cramer | Oct. 16, 1951 |
| 2,792,320 | Bower | May 14, 1957 |